Nov. 24, 1970     I. P. MAIL ET AL     3,542,675

WATER TREATMENT

Filed July 26, 1968     2 Sheets-Sheet 2

INVENTORS.
ISAAC P. MAIL
JAMES R. KENNETT

ATTORNEY

United States Patent Office 3,542,675
Patented Nov. 24, 1970

3,542,675
WATER TREATMENT
Isaac P. Mail and James R. Kennett, Tulsa, Okla., assignors to Combustion Engineering, Inc., New York, N.Y., a corporation of Delaware
Filed July 26, 1968, Ser. No. 748,106
Int. Cl. B03d 1/00
U.S. Cl. 210—44                                          6 Claims

ABSTRACT OF THE DISCLOSURE

Contaminated liquid having particles of solid foreign matter suspended therein flows through a container. Liquid saturated with gas is flowed into the container and through a venturi structure which reduces the pressure on the saturated liquid to enable bubbles of gas to form in the liquid. The flow rate of the gasified liquid is controlled to maintain a predetermined ratio to the flow rate of the contaminated liquid flowing through the container.

BACKGROUND OF THE INVENTION

Field of the invention

The present invention relates generally to the flotation of solid contaminating material from liquid and more specifically to the control of the quantity of gas bubbles applied to the contaminants suspended in liquid.

Description of the prior art

The flotation method of removing solid particulate matter from liquid is an old art. Bubbles of gas have long been generated to mix with the material and float it to the top of its carrier liquid.

The practice of generating extremely small gas bubbles has been recently advanced as evidenced by at least the disclosure of U.S. Pat. 3,418,236. However, there is the more comprehensive problem of contacting and mixing the bubbles with solid particulates within a flow of contaminated liquid.

The present invention contemplates a flow of contaminated liquid into a zone where its treatment results in the removal of solid particulates. A carrier liquid has gas absorbed in it and this mixture is depressured within the treatment zone to nucleate the gas into bubbles which attach to the suspended particulates and float them to the upper portion of the zone for removal. The flow of gas-saturated liquid is regulated to release enough of the small gas bubbles to consistently and effectively float the contaminants out of the liquid so treated.

The invention further contemplates a container within which a treatment zone is established. A housing is mounted within the container and contains an adjustable venturi structure through which a gas-saturated carrier liquid is passed. A liquid to be treated by removal of suspended solid particulates is flowed through the container. A source of gas-saturated carrier liquid is flowed through the venturi structure. The flow rate of the carrier liquid to the venturi is sensed and a control signal developed by the rate is applied to a mechanism which adjusts the venturi to maintain a predetermined flow rate of the carrier liquid to the venturi and, therefore, contaminated water and gas bubbles are brought together in an efficient union as not completely developed in the prior art. This match of quantities within the dynamics of commercial applications has been crude, not fully automated, and therefore inefficient and erratic. The present invention achieves a tremendous reduction in these problems to make possible a smooth, dependable operation producing consistent results.

SUMMARY OF THE INVENTION

A principal object of the invention is to control the quantity of gas bubbles placed in contact with the solid particulates suspended in a liquid.

Another object is to control the flow rate of a mixture of gas and liquid into a contaminated liquid.

Another object is to control the ratio of the rate of a contaminated liquid and the rate of a liquid saturated with a gas which are commingled so the bubbles of gas generated will be sufficient in size and quantity to effectively and efficiently mix with, and adhere to, the contaminants, carrying them to a location from which they can be readily removed from the liquid.

Another object is to maintain a consistent pressure drop in the flow of gas-saturated liquid so the gas will generate a predetermined quantity of bubbles for the flotation function. The flow rate of the contaminated water into the container is controlled and coordinated with the flow rate of the carrier liquid to maintain a desired ratio between these flow rates. The result achieved by this use of this structure is the maintenance of a desired quantitative match between the contaminated water and bubbles as the treating agent.

Other objects, advantages and features of this invention will become apparent to one skilled in the art upon consideration of the written specification, appended claims, and attached drawing, wherein;

DESCRIPTION OF THE PREFERRED EMBODIMENT

Figure 1:
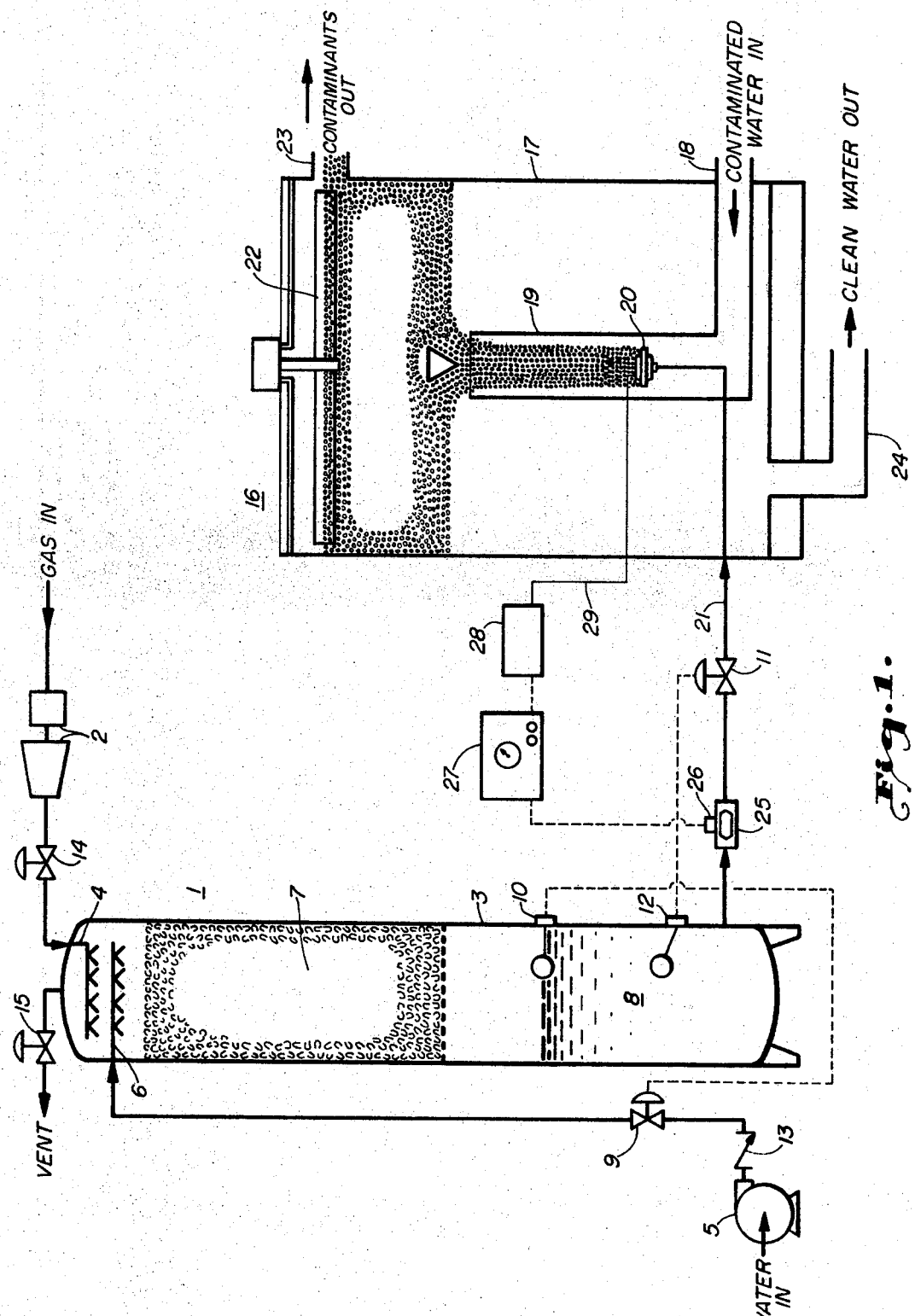
FIG. 1 is a diagrammatic depiction of the control system in place in the decontamination system.

FIG. 1 is designed to give a broad and generalized understanding of the embodiment of the invention. It presents with clarity the relationships among the three major components of the system; namely, the gas-liquid aeration column, the controls, and the flotation chamber. Many of the various valves, flanges and unions, and other piping details are omitted as not material.

There are several actual reductions to practice of this invention in operation. These units have been arranged and mounted to occupy minimum space. They necessarily present a maze of piping and wiring, and often have their control elements in a central control location apart from the installation itself.

SATURATION COLUMN

The saturation column is indicated generally at 1. Gas (in this embodiment, air) is compressed by compressor 2 and is introduced into the upper portion of a vessel 3 by a distributor 4. Liquid (in this embodiment, water) is provided to the column through pump 5, and is also introduced into the top portion of the tower 1 by a spreader arrangement at 6. The gas and liquid will be specified hereafter.

The air and water entering the column begin a concurrent flow by gravity through the mixing section 7. This section must provide sufficient time and intimacy of contact between the air and water to allow absorption of the air by the water. The aerated water is then stored for use in a reservoir section 8 of vessel 3.

Incidental to the invention are the several controls which regulate the operation of the aeration column 1. Rate control valve 9 operated by the position of the normal level control 10, and rate control valve 11 operated by low level control 12 regulate the input of water into the column 1. A check valve 13 is also shown for pump 5. Similar to valves 9 and 11, valve 14 maintains the input of air into the column. A vent valve 15 controls the pressure in vessel 3.

FLOTATION CHAMBER

The flotation chamber for the removal of suspended particles from contaminated water is indicated generally at 16. Its well-known structure consists of the vessel 17, the intake line 18 for contaminated water, a mixing chamber 19 for initiating mixing of the bubbles and contaminated water, a variable venturi valve 20 for nucleation of the bubbles connected to the saturated air-water line 21, removal means 22 for suspended particles floating on the bubble mass, a particle (contaminant) outlet line 23, and a clean water outlet line 24.

The saturation tower and flotation cell in and of themselves do not embody the invention. However, understanding of the disclosure requires at least a superficial appreciation of the flotation technique for removal of suspended particulates from a liquid.

OPERATION OF THE SYSTEM

The gas (air) saturated carrier liquid enters the flotation cell 16 through line 21. It passes into variable venturi valve 20; this valve is disclosed in U.S. Pat. 3,446,488. The saturated carrier water, in passing through the venturi, experiences a pressure drop from that in line 21. The air is thus caused to go out of solution and form bubbles in the carrier water.

It is desirable where the contaminating particles are very small to produce bubbles all of which are of very small size, and to produce them at a constant rate.

The small size bubble is required in order to achieve a maximum number of encounters between a bubble surface and a suspended particle. It is apparent that a few large diameter bubbles offer less surface area than many small bubbles, due to the geometrical relationship between spherical volume and spherical surface area. This axiom can be expressed similarly by stating that the "denser" the bubble matrix (i.e., the smaller the bubble), then the higher the statistical probability of contact between bubble surface and particle, and the more efficient the flotation process.

The uniformity of bubble size and constant rate of production are desired to insure that all bubbles rise to the surface at a constant rate, to insure that the bubble matrix is as homogeneous and as dense as possible, and to maintain a consistent flow pattern between the contaminated influent and the carrier water.

It was also discovered during basic studies in this field that very small bubbles were obtained by providing a period of isolation within valve 20 after the pressure drop was taken across the venturi of valve 20. This teaching is presented in detail in U.S. Pat. 3,418,236.

In operation of the flotation chamber 16, the several factors discussed briefly above are closely supervised. Their control is relatively simple and problem-free. In order to illustrate the control method disclosed in the present application, we assume such factors are being satisfactorily supervised. For example, assume (1) that air saturation in the carrier water of line 21 is constant, (2) that the flow rate of the contaminated influent is constant, and (3) that the pressure drop taken across valve 20 is great enough to produce an efficient nucleation of the quantity of bubbles required.

Since the ratio of flow rates between the contaminated and carrier waters necessary for satisfactory decontamination is known and since the contaminated influent flow rate is constant, the required flow rate of the aerated carrier water in line 21 can be determined, and becomes the variable to be controlled. The difficulty of controlling this independent variable is understood when it is observed that the flow rate in conduit 21 is dependent not merely on the pressure in vessel 3, but on the position of variable venturi valve 20 at any particular moment. (It is emphasized that the venturi opening of valve 20 may be continuously adjusting to insure the carrier flow rate and pressure drop through valve 20 required to achieve adequate bubble production is maintained.)

THE CONTROL METHOD

The invention is in the control of the flow rate of aerated carrier liquid through the venturi valve in a manner that maintains the predetermined ratio of aerated to contaminated water necessary for decontamination.

This novel control method is carried out utilizing turbine meter 25 and magnetic pickup 26, flow rate analyzer and set point indicator 27, electric-to-pneumatic transducer 28, and valve 20.

Figure 2:
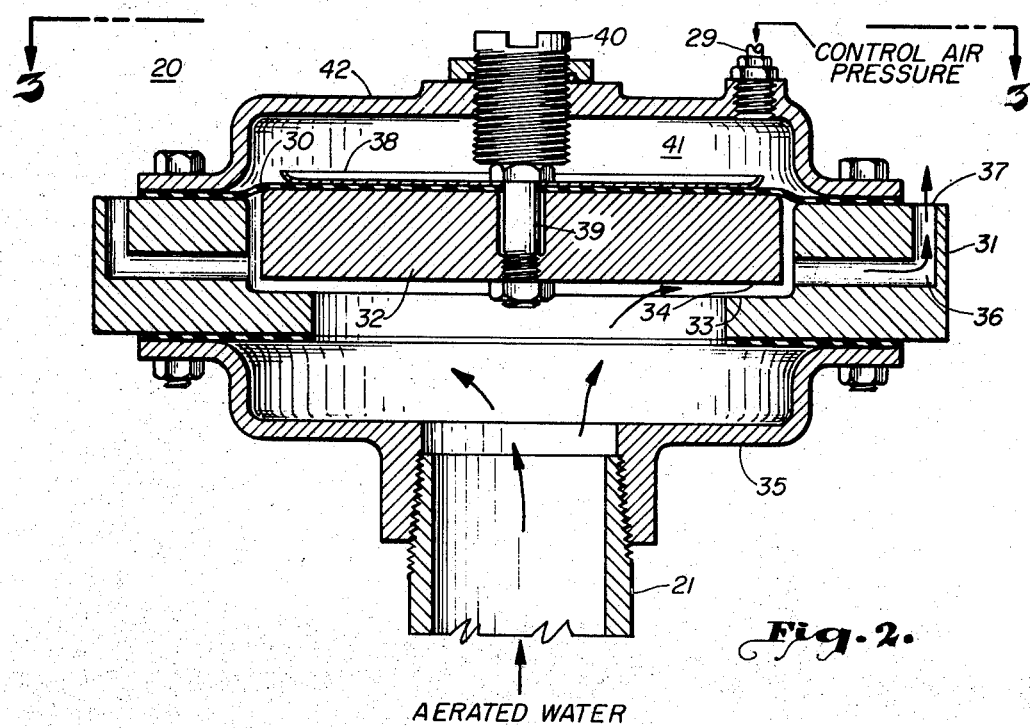
FIG. 2 is a sectioned elevation of the variable venturi valve located within the flotation chamber of the system to produce the flotation agent.
Figure 3:
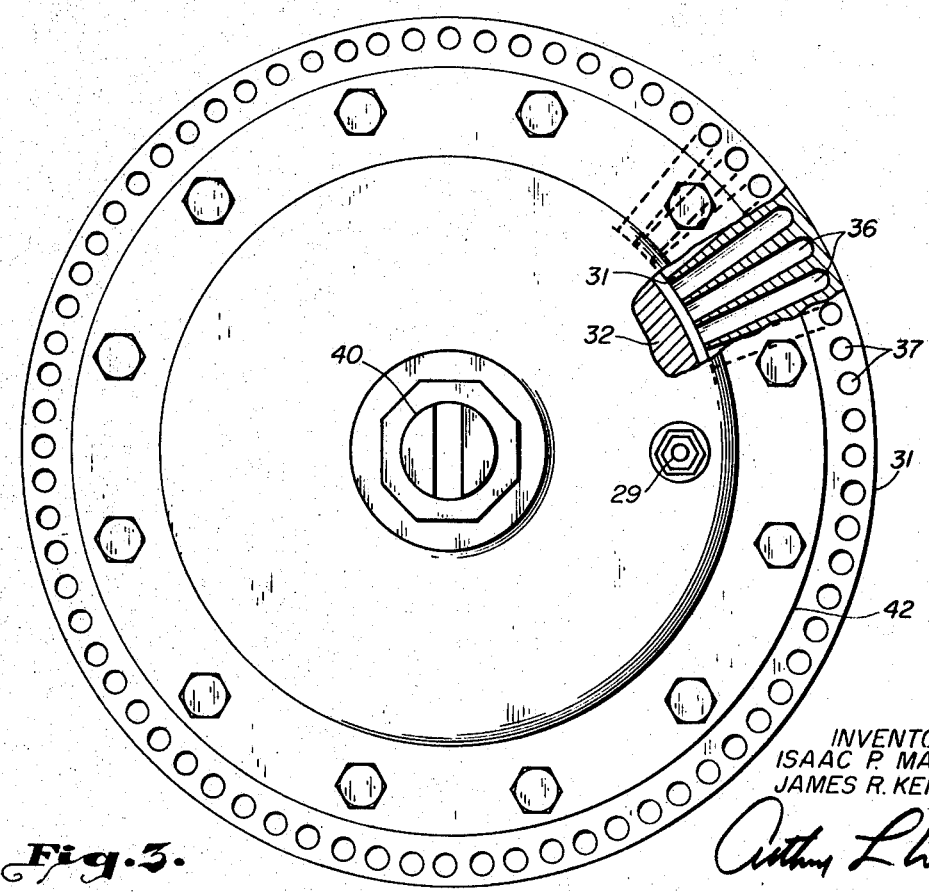
FIG. 3 is a plan view of the valve of FIG. 2 taken across view lines 3—3.

Referring to FIGS. 2 and 3, there is depicted in detail the structure of the variable venturi valve 20. The valve elements are situated below the diaphragm 30. The valve body 31 and the valve element 32 cooperate to regulate the flow of water through the valve. Surface 33 on the body 31 can be visualized as the valve seat which will engage surface 34 of element 32 when no flow exists through the valve 20.

During treatment of contaminated influent in chamber 16, there is a flow of aerated water through valve 20. The necessary separation between surfaces 33 and 34 forms, in effect, a venturi. The size of this passage determines the pressure drop on the aerated water to initiate the nucleation of bubbles.

Aerated water enters the valve from line 21 and passes through the lower diaphragm case 35, across the venturi between 33 and 34, and into a plurality of conduits 36 formed in body 31. The newly formed bubbles exit valve 20 at the several openings 37 on the periphery of body 31.

Valve element 32 is fixed to diaphragm 30 and diaphragm backing plate 38 by bolt 39. This bolt is the connecting means by which the movement of element 32 is made responsive to the movement of the diaphragm. In addition bolt 39 functions as the means by which the upward travel of diaphragm 30 and valve element 32 is limited. To insure that the size of the venturi opening will always be restricted sufficiently to create an adequate pressure drop for anticipated conditions in a particular system, an adjustable stop 40 is extended into the upper diaphragm volume 41 within upper diaphragm case 42.

Volume 41 is the chamber which contains the pneumatic control pressure of line 29. A decrease in flow rate in line 21 creates a reduced pressure condition above the diaphragm; the diaphragm 30 and valve element 32 respond by movement upward and consequent enlargement of the venturi opening between surfaces 33 and 34. If the carrier water flow rate increases, the pressure above diaphragm 30 increases to reduce the venturi size and thus the flow rate.

Referring again to FIG. 1, it is seen that fluid flow of the aerated carrier water through the turbine meter 25 causes a disruption of the magnetic flux established by the magnet in pickup 26. These disruptions are transmitted as electrical pulses to the analyzer 27 and hence to transducer 28. The electrical signal is converted by the transducer to a pneumatic pressure. The pressure established in line 29, through the diaphragm actuator 30 in valve 20 controls the size of the venturi opening in valve 20. As disclosed above, in this manner is the flow rate of the carrier and the pressure drop imposed thereupon controlled. Indicator 27 is also of value in providing means for visual examination of the flow condition in the carrier water line 21.

If the turbine meter 25 registers a deviation in the desired flow rate in line 21, the output from pickup 26 changes. The analyzer 27 then operates to increase or decrease the pneumatic pressure in line 29 through transducer 28. If the flow should decrease, for example, due to either a restriction in the venturi in 20 or to a changed condition in vessel 3, the air pressure in line 29 will be reduced allowing the venturi to enlarge, reduce the back pressure on line 21, and permit the increase of the flow rate of the carrier water to the desired level. It is assumed as stated above in the description of valve 20 that a sufficient pressure drop will always occur across the venturi to permit adequate nucleation to treat the contaminated influent.

The operation of the control system disclosed insures that required bubble nucleation will continue automatically. Should the venturi opening become larger, as from abrasion, or smaller, as from plugging, the change thus caused in the preset operating pressure present within the pressure control volume 41 of valve 20 is corrected as the diaphragm in valve 20 moves to reduce or enlarge the venturi passage to the size necessary to re-establish the normal condition. Corrections are made in the same manner when pressure in the valve changes due to fluctuations in the flow rate in line 21, since they also cause an increase or decrease in the pressure drop at the valve.

It is stressed to illustrate the refinement of this novel control method that the pressure variation which causes a change in the system components may occur at the venturi or in the aerated carrier water flow line. In both cases, the venturi opening automatically adjusts to such condition as will maintain a predetermined ratio between the aerated and contaminated waters. In the former instance, the stimulus is external to the control components and may be thought of as a "feedback" control technique, while in the latter the stimulus is in the aerated carrier flow line (or "internal") and an order to change the control pressure above the diaphragm 30 of valve 20 re-establishes the desired rate.

High and low shutdown set points may be set on the indicator 27. For example, if the flow rate in line 21 decreases to the extent that the valve 20 may not enlarge the venturi sufficiently to re-establish the predetermined rate such that adequate pressure drop and nucleation are present, analyzer 27 may shut down the system. Likewise, if the flow in line 21 increases to a point at which the ratio of carrier water to contaminated water is unacceptably high even when the pressure in volume 41 is a maximum and the venturi opening is a minimum, analyzer 27 may shut down the system.

It is obvious from the specification that a turbine meter could be positioned in line 18 and integrated into the control system to function in a manner identical to the method disclosed. This meter may be used in lieu of or in conjunction with meter 25.

It is seen from the specification that the control method disclosed deals effectively to maintain good flotation treatment of a contaminated influent. This is accomplished by closely supervised control of production of the quantity of bubbles required which in turn is regulated by maintenance of a predetermined ratio of the flow rates in lines 21 and 18.

This novel method employs both direct and feedback regulation, automatically or manually, of the variable chosen to be critical in this method to the efficiency of the flotation process. This variable is the flow rate in the carrier liquid line. This control method assures a proper ratio of an aerated carrier liquid and contaminated influent and thus a proper quantity of the flotation agent.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understod that all matter herein set forth or shown in the accompanying drawing is to be interpreted as illustrative and not in a limiting sense.

The invention having been described, what is claimed is:

1. A system in which solid foreign matter is removed from liquid, including,
   a first container,
   a conduit connected to the first container and through which liquid having particles of foreign matter suspended therein is introduced at a known rate into the first container,
   a second container connected to sources of liquid and gas for receiving the liquid and gas therein, whereby the gas is absorbed in the liquid,
   a valve providing a variable venturi structure mounted within the first container and connected to the second container to receive the mixture of liquid and gas,
   a means mounted in the connection between the second container and the valve and arranged to respond to the flow of liquid and gas mixture,
   and control means connected to the means responding to the flow of the liquid and gas mixture and connected to the valve to adjust the variable venturi structure to maintain a predetermined ratio between the flow rate of contaminated liquid into the first container and the flow rate of the liquid and gas mixture into the first container,
   the pressure on the liquid and gas mixture being reduced through the venturi structure to nucleate bubbles which attach to and mix with the particles of foreign matter and float them to an upper portion of the first container for removal while the uncontaminated liquid is removed from a lower portion of the first container.

2. The system of claim 1 in which, the contaminated liquid is water associated with oil well production and the foreign matter is solid particles suspended therein.

3. The system of claim 2 in which, the gas absorbed in the liquid is air and the liquid is water.

4. A process for removing solid foreign matter from liquid, including,
   flowing liquid having particles of foreign matter suspended therein into a treatment zone at a known rate,
   absorbing gas in a liquid,
   flowing the gasified liquid into the treatment zone, and
   controlling the flow rate of gasified liquid into the treatment zone and nucleation of bubbles therefrom by adjusting of a variable restriction to the flow rate of the gasified liquid in response to a measurement of the flow rate,
   the control of the flow rate of gasified liquid being effected by the restriction to maintain a predetermined ratio between the flow rates of contaminated and gasified liquids into the zone, and a pressure reduction upon the gasified liquid being effected by the restriction to nucleate bubbles which attach to the suspended foreign matter and float it to an upper portion of the zone for decontamination of the contaminated liquid.

5. The process of claim 4, wherein, the contaminated liquid is water associated with oil well production and the foreign matter is solid particles suspended therein.

6. The process of claim 4, wherein, the gas absorbed in the liquid is air and the liquid is water.

References Cited

UNITED STATES PATENTS

| | | | |
|---|---|---|---|
| 2,876,863 | 3/1959 | Kivari | 210—44 X |
| 3,117,082 | 1/1964 | Schluter | 210—221 |

MICHAEL E. ROGERS, Primary Examiner

U.S. Cl. X.R.

137—98; 210—101; 261—124